United States Patent
Barbey et al.

(10) Patent No.: US 6,526,437 B1
(45) Date of Patent: Feb. 25, 2003

(54) SERVER FOR ENABLING N PAIRS OF MACHINES TO COMMUNICATE, AND A DECT PRIVATE TELECOMMUNICATIONS NETWORK INCLUDING SUCH A SERVER

(75) Inventors: Jean-Pierre Barbey, Cergy (FR); Jean-François Criqui, Asnieres (FR); Jean-René Rousseau, Neuville S/Oise (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/507,681

(22) Filed: Feb. 22, 2000

(30) Foreign Application Priority Data

Feb. 23, 1999 (FR) ............................................. 99 02249

(51) Int. Cl.[7] .............................................. G06F 15/16
(52) U.S. Cl. ....................................................... 709/217
(58) Field of Search ................................. 709/219, 200, 709/217

(56) References Cited

U.S. PATENT DOCUMENTS 5,544,318 A * 8/1996 Schmitz et al. ............. 709/207
5,870,464 A * 2/1999 Brewster et al. ............ 709/317
6,324,492 B1 * 11/2001 Rowe .......................... 703/13
6,345,240 B1 * 2/2002 Havens ........................ 703/21

FOREIGN PATENT DOCUMENTS

| EP | 0 589 619 A2 | 3/1994 |
| WO | WO 93/20642 | 10/1993 |

* cited by examiner

Primary Examiner—David Y. Eng
(74) Attorney, Agent, or Firm—Sughrue Mion, PLLC

(57) ABSTRACT

The server includes one pair of simulators for each pair of machines, a first machine and a second machine of any given pair being connected to respective ones of two simulators respectively simulating the behavior of the second machine and the behavior of the first machine. It further includes means for interconnecting all of the simulators, each simulator being capable of communicating with each of the other simulators. For a given pair of machines, the simulator of the second machine includes means for making the first machine believe that certain resources of a third machine are situated in the second machine of the pair in question. Application to providing new services, in particular for making it possible to use GSM terminals in a DECT private network.

4 Claims, 3 Drawing Sheets

US 6,526,437 B1

SERVER FOR ENABLING N PAIRS OF MACHINES TO COMMUNICATE, AND A DECT PRIVATE TELECOMMUNICATIONS NETWORK INCLUDING SUCH A SERVER

FIELD OF THE INVENTION

The invention relates to a server suitable for being cut in between two machines or n pairs of machines, and capable of analyzing and processing information interchanged between the machines, so as to offer new services to the machines, without modifying said machines.

BACKGROUND OF THE INVENTION

A first problem targeted by the invention is to provide new services in an existing telecommunications network without modifying the structure of the network.

A second problem targeted by the invention is the use of GSM terminals in a DECT private network. Such a network includes a private exchange, DECT mobile radiotelephone terminals, and optionally fixed telephone terminals. The network includes DECT base stations coupled to the private exchange by means of an interface specific to the DECT base stations.

Such a network is used in a firm. It gives employees a degree of mobility within the premises of a site of the firm. However, a firm often has more than one site. Certain employees thus move through several sites and outside the firm. In order to be reached almost everywhere, each employee carries a GSM radiotelephone terminal enjoying a subscription for the purpose of using a public GSM network. Employees are thus expected to use at least two different types of terminal depending on whether or not they are within a site of the firm.

Requiring the same employee to have more than one terminal is impractical, in particular because that employee then has more than one telephone number. In addition, employees are tempted to use their GSM terminals only, even though the cost of the calls is higher than that of calls via the DECT private network, and even though the public GSM network does not provide all of the services that can be obtained from the private exchange of a firm. Furthermore, users from outside a firm are tempted to call employees of the firm via their GSM terminals and not via their cord or cordless (DECT) terminals, in order to maximize the chances of reaching them. It is therefore desirable for the employees of a firm to be able to use their GSM terminals via the private network of the firm.

The authentication and enciphering procedures for a GSM call involve cryptographic algorithms and secret keys. Such keys cannot be made available to private networks otherwise the security of the calls would be jeopardized. Nor would it be acceptable for GSM calls through a private network not to enjoy the security provided by those authentication and enciphering procedures.

OBJECTS AND SUMMARY OF THE INVENTION

Objects of the invention are: to make it possible for the employees of a firm to use their GSM terminals within a site or within a plurality of sites of the firm at low cost and with the same services as if they were using DECT terminals; to make it possible for duly authorized external visitors to use their GSM terminals as DECT terminals of the firm in order to access the fixed public network via the private exchange of the firm, or in order to be called via the fixed public network; and optionally to make it possible for unidentified external users to enjoy the use of the same GSM base station.

Another object is to make it possible for employees also to enjoy certain telephone services and mobility that their GSM subscriptions offer them, and that the DECT private network of the firm does not offer them.

The invention provides firstly a server for enabling n pair(s) of machines to communicate, where n is not less than 1; the machines in each pair being capable of communicating with each other;

said server including:
one pair of simulators for each pair of machines, a first machine and a second machine of any given pair being connected to respective ones of two simulators respectively simulating the behavior of the second machine and the behavior of the first machine;
means for interconnecting all of the simulators, each simulator being capable of communicating with each of the other simulators; and
for a given pair of machines, the simulator of the second machine includes means for making the first machine believe that certain resources of a third machine are situated in the second machine of the pair in question.

The server of the invention is transparent to the services offered to the first machine by the second machine of the same pair, but it makes it possible for the first machine also to enjoy new services offered by a third machine, with which it cannot usually communicate.

BRIEF DESCRIPTION OF THE DRAWINGS

The invention will be better understood and other characteristics will appear on reading the following description with reference to the accompanying figures, in which.

MORE DETAILED DESCRIPTION

Figure 1:
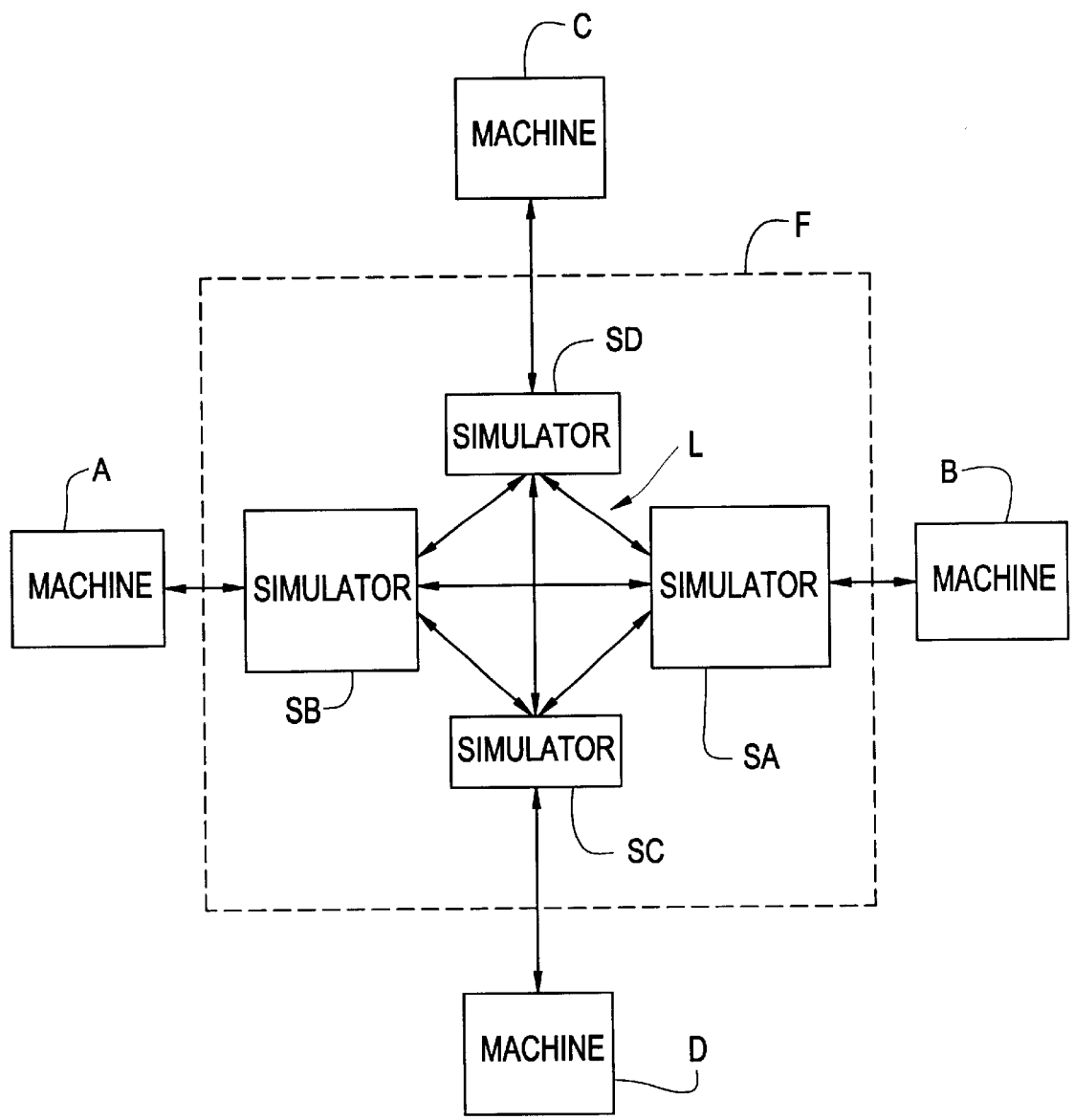
FIG. 1 is a diagram of an embodiment of the server of the invention.

FIG. 1 is a diagram showing an embodiment F of the server of the invention, when it is interposed between four machines A, B, C, D. The machines are capable of communicating in pairs only, A & B and C & D. The server F comprises:

A simulator SB connected to machine A so as to simulate machine B, i.e. so as to make machine A believe that it is communicating with machine B while it is in fact communicating with another machine, C or D, with which it is incapable of communicating directly because of a difference in standard or in protocol. The simulator SB makes machine A believe that certain resources of a third machine are situated in machine B. Therefore, it makes it possible for machine A to enjoy new services provided by said third machine.

A simulator SA connected to machine B so as to simulate machine A, i.e. so as to make machine B believe that it is communicating with machine A while it is in fact communicating with another machine, C or D, with which it is incapable of communicating directly because of a difference in standard or in protocol. The simulator SA makes machine B believe that certain resources of a third machine are situated in machine A. Therefore, it makes it possible for machine B to enjoy new services provided by said third machine.

A simulator SD connected to machine C so as to simulate machine D, i.e. so as to make machine C believe that it is communicating with machine D while it is in fact communicating with another machine, A or B, with which it is incapable of communicating directly because of a difference in standard or in protocol. The simulator SD makes machine C believe that certain resources of a third machine are situated in machine D. Therefore, it makes it possible for machine C to enjoy new services provided by said third machine.

A simulator SC connected to machine D so as to simulate machine C, i.e. so as to make machine D believe that it is communicating with machine C while it is in fact communicating with another machine, A or B, with which it is incapable of communicating directly because of a difference in standard or in protocol. The simulator SC makes machine D believe that certain resources of a third machine are situated in machine C. Therefore, it makes it possible for machine D to enjoy new services provided by said third machine.

Each simulator SA, SB, SC, SD is connected to each of the other simulators via links L, and is capable of communicating with it.

The server of the invention may be used to offer new services in a telecommunications network without requiring any significant modifications to the existing equipment. For example, in a GSM network, messages requesting a particular service may be diverted from a first mobile services switching center (MSC) to a second MSC, if the first MSC does not offer the service and the second MSC does offer it.

Figure 2:
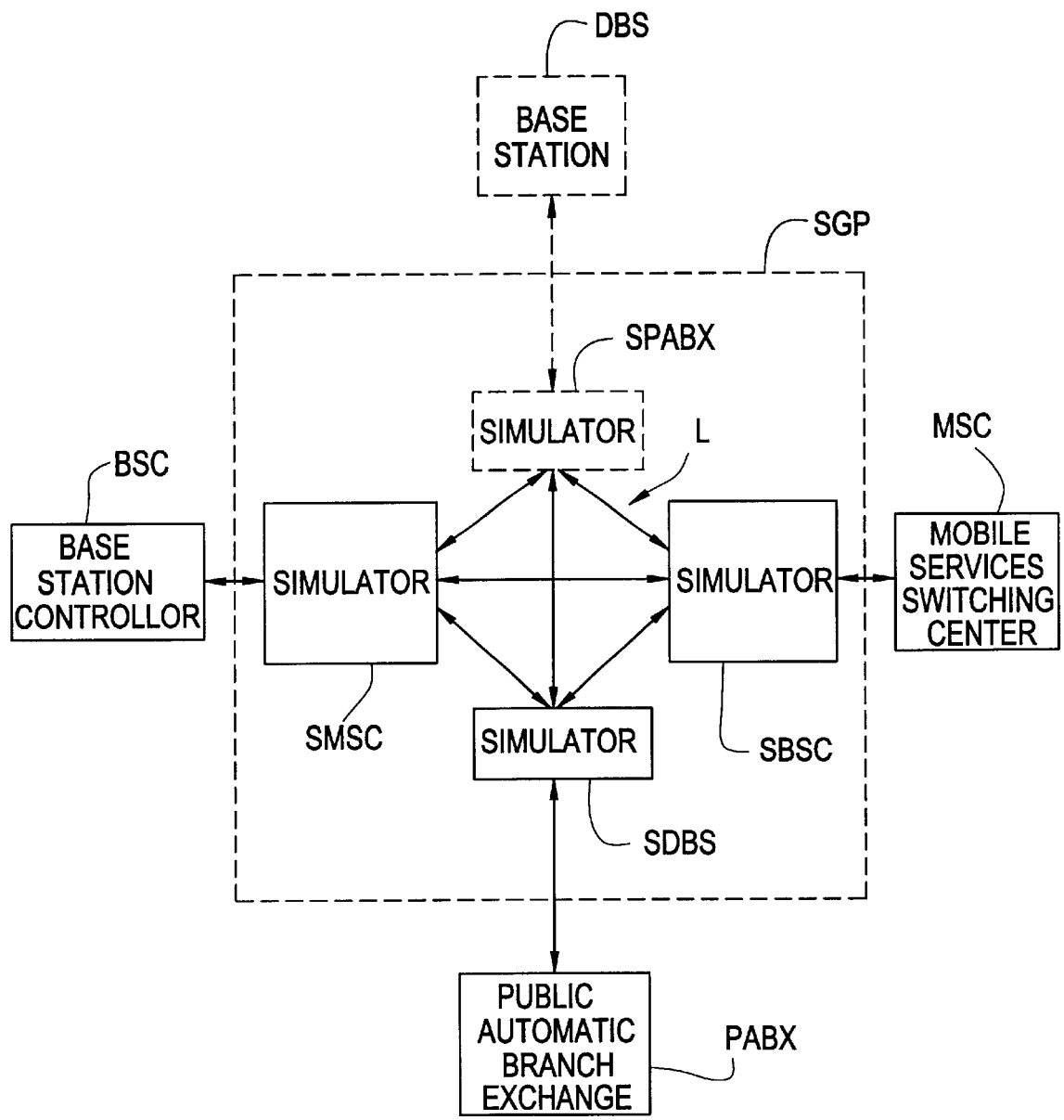
FIG. 2 shows an embodiment when the server is interposed between two nodes of a GSM public network, so as to enable GSM terminals to enjoy the services offered by a DECT private network.

FIG. 2 shows an embodiment of the server of the invention, when it is used to enable GSM terminals to enjoy the services offered by a DECT private network. It is interposed between two nodes, BSC and MSC, of a GSM public radiotelephony network. The node BSC is a GSM Base Station Controller, and the node MSC is a GSM Mobile services Switching Center. The server SGP is further connected to a Public Automatic Branch Exchange PABX of a private network, and optionally to a DECT base station referenced DBS.

The GSM base station controller BSC and the GSM mobile services switching center MSC are two machines that usually communicate with each other using a GSM protocol. The private exchange PABX usually communicates with the DECT base station using a DECT protocol. There are thus two pairs of machines, which pairs cannot usually communicate with each other.

The server SGP comprises:

a simulator SDBS connected to the PABX and simulating a DECT base station so as to make the PABX believe that it is connected to radiotelephone terminals via base stations operating in compliance with the DECT Standard, while the simulator SDBS is in fact receiving signalling signals and voice signals from the controller BSC which is operating in compliance with the GSM Standard;

a simulator SMSC simulating the MSC and operating in compliance with the GSM Standard so as to make the GSM controller BSC believe that it is connected to the MSC while said simulator SMSC is in fact receiving signalling signals and voice signals from the PABX which is operating in compliance with the DECT Standard, for certain calls; and so as to deliver to said controller BSC signalling signals and voice signals that do indeed come from the MSC, for other calls;

a simulator SBSC simulating the controller BSC so as to make the MSC believe that it is connected to the controller BSC while it is in fact connected to the PABX, at certain times; and so as actually to connect it to the controller BSC via the simulator SMSC for the rest of the time; and optionally, a simulator SPABX simulating the PABX so as to make the optional base station DBS believe that it is connected to the PABX while it is in fact connected to the MSC or to the controller BSC, at certain times.

The server SGP makes it possible for GSM terminals to enjoy the services of a private network PN built around the PABX which usually communicates with DECT terminals only. The server SGP analyzes all of the messages coming from the controller BSC and from the MSC, and it diverts towards the PABX all signalling messages concerning GSM terminals belonging to the private network PN except those that concern the authentication and enciphering of GSM calls. The GSM terminals that communicate with the controller BSC and that are declared as belonging to the private network PN can thus enjoy these security procedures specific to the GSM network, while also enjoying the services specific to the private network.

Figure 3:
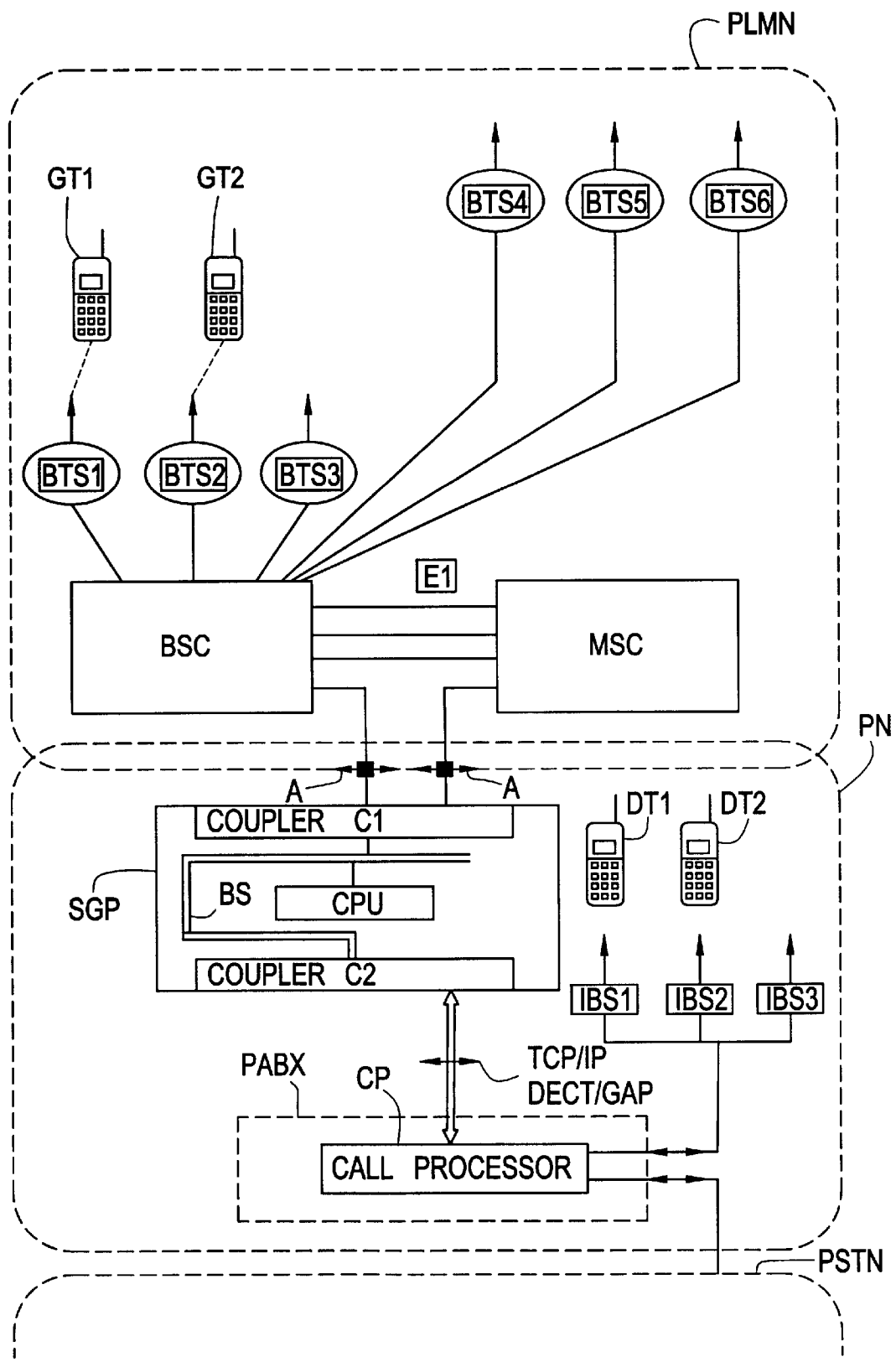
FIG. 3 is a more detailed summary diagram of an example of a DECT private network including this embodiment of the server of the invention.

FIG. 3 shows this embodiment in more detail. In addition to the PABX, the private network PN includes:

base stations of the DECT type: DBS1, DBS2, DBS3, connected to the PABX; and the private GSM server SGP.

The site of the firm in question is further served by GSM Base Transceiver Stations: BTS1, BTS2, BTS3; a GSM Base Station Controller: BSC; and a GSM Mobile services Switching Center: MSC; all of which belong to a Public Land Mobile Network (PLMN), but which have been installed on the site at the request of the firm. The BSC may be connected to other GSM base stations: BTS4, BTS5, BTS6, outside the firm. Thus, within the site of the firm, both DECT terminals DT1, DT2, . . . and GSM terminals GT1, GT2, . . . are in operation simultaneously.

The PABX is connected in particular to a fixed Public Switched Telephone Network PSTN. The GSM terminals can be used conventionally, i.e. by communicating via the PLMN but they can also be used via the fixed network PSTN via the PABX. In addition, this makes it possible for them to enjoy all of the services of the private network PN in which the PABX is integrated, in particular: local calls with other fixed or mobile terminals of the PN, and calls via the fixed public network PSTN, while also conserving the services provided by the GSM network.

Optionally, discrimination may be effected to reserve access to the base stations BTS1, BTS2, BTS3 to the employees of the firm, even for calls via the PLMN. A procedure for making a declaration to the SGP makes it possible to assign this right of access to the employees of the firm and to certain visitors.

The server SGP is essentially constituted by a Central Processing Unit CPU, by a bus BS, and by coupler cards:

a coupler card C1 connects it to the BSC and to the MSC; and a coupler card C2 connects it to the call processor CP of the PABX using the DECT/GAP protocol suited to the PABX.

The inlet-outlet of the BSC and the inlet-outlet of the MSC that are connected to the card C1 are usually connected together, in a conventional GSM network, by 2 Mb/s lines using an "A" interface standardized by GSM for interchanging signalling information and speech channels. The card C1 of the server SGP is inserted into two of said lines between the BSC and the MSC. The GSM speech channel signalling is conveyed by semaphore channels using the No. 7 signalling protocol of the A interface and they are taken into account by the card C1. The card C1 is seen by the No. 7 signalling network as two signalling points. The corresponding speech channels of the card C1 are connected permanently to the bus BS.

The signalling is taken into account by the card C2. When a call is made from a GSM terminal belonging to the private network PN, the card C2 converts the GSM protocol into DECT/GAP protocol which is accepted by the PABX. When a call is made to a GSM terminal belonging to the PN, the CPU converts the DECT/GAP protocol into a GSM protocol which is accepted by the BSC.

For each of the GSM terminals that are considered as belonging to the PN, i.e. those terminals belonging to the firm and those belonging to visitors who have been duly declared, the server SGP stores:

the International Mobile Subscriber Identity (IMSI), and the Temporary Mobile Subscriber Identity (TMSI);

the DECT identity referred to as the "International Portable User Identity" used in the PABX, and the telephone number;

the IMSI/telephone number relationship;

the IPUI/telephone number relationship;

and optionally the identity of the company owning the terminal.

For the PABX, everything takes place as if it were handling DECT terminals via a DECT-type base station, such as DBS1, DBS2, DBS3; and, for the GSM terminals GT1, GT2, GT3, everything takes place as if they were communicating with a GSM base station of a GSM public network.

The function of the server SGP is to divert the messages coming from GSM terminals, such as GT1 and GT2, that belong to the PN, except for messages concerning authentication, enciphering, and mobility in the GSM network. The GSM terminals enjoy GSM call enciphering and authentication procedures because the signalling messages concerning these procedures are transmitted transparently and in both-way manner between the BSC and the MSC, while all of the other messages are diverted towards equipment of the PN so that the terminals can further enjoy the services of the private network.

The messages concerning the other GSM terminals which do not belong to the PN are transmitted transparently between the BSC and the MSC.

The messages concerning services not known by the server SGP are transmitted transparently between the BSC and the MSC.

What is claimed is:

1. A server for enabling n pair(s) of machines to communicate, where n is not less than 1; the machines in each pair being capable of communicating with each other;

said server including:

one pair of simulators for each pair of machines, a first machine and a second machine of any given pair being connected to respective ones of two simulators respectively simulating the behavior of the second machine and the behavior of the first machine;

means for interconnecting all of the simulators, each simulator being capable of communicating with each of the other simulators; and for a given pair of machines, the simulator of the second machine includes means for making the first machine believe that certain resources of a third machine are situated in the second machine of the pair in question.

2. A server according to claim 1, making it possible to use mobile radiotelephone terminals operating in compliance with a first standard in a private telecommunications network operating in compliance with a second standard, the private network including:

a private exchange operating in compliance with the second standard;

mobile radiotelephone terminals operating in compliance with the second standard;

base stations operating in compliance with the second standard, and having input-outputs coupled to input-outputs of the private exchange, each input-output being provided with an interface specific to the second standard;

base stations operating in compliance with the first standard;

a base station controller operating in compliance with the first standard; and a mobile services switching center operating in compliance with the first standard;

said server including:

a first simulator simulating a base station operating in compliance with the second standard, so as to make the private exchange believe that it is connected to radio-telephone terminals via base stations operating in compliance with the second standard, while the first simulator is in fact receiving signalling signals and voice signals coming from a controller operating in compliance with the first standard;

a second simulator simulating a mobile services switching center operating in compliance with the first standard so as to make the GSM controller believe that it is connected to the mobile services switching center operating in compliance with the first standard while said second simulator is in fact receiving signalling signals and voice signals coming from the private exchange operating in compliance with the second standard, for certain calls; and so as to deliver to said controller signalling signals and voice signals that do indeed come from the mobile services switching center operating in compliance with the first standard, for other calls; and a third simulator simulating a base station controller operating in compliance with the first standard so as to make the mobile services switching center operating in compliance with the first standard believe that it is connected to a controller operating in compliance with the first standard while it is in fact connected to the private exchange operating in compliance with the second standard, at certain times; and so as actually to connect it to the controller operating in compliance with the first standard via the second simulator for the rest of the time.

3. A server according to claim 2, the server being transparent for the messages concerning the authentication and enciphering procedure for a call complying with the first standard.

4. A DECT private telecommunications network, including a server according to claim 1, so as to enable GSM terminals to enjoy the services offered by the DECT private network.

* * * * *